United States Patent
Higuchi et al.

(10) Patent No.: US 10,768,967 B2
(45) Date of Patent: Sep. 8, 2020

(54) MAINTENANCE CONTROL METHOD, SYSTEM CONTROL APPARATUS AND STORAGE MEDIUM

(71) Applicant: FUJITSU LIMITED, Kawasaki-shi, Kanagawa (JP)

(72) Inventors: Junichi Higuchi, Kawasaki (JP); Masazumi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 16/107,186

(22) Filed: Aug. 21, 2018

(65) Prior Publication Data
US 2019/0065235 A1     Feb. 28, 2019

(30) Foreign Application Priority Data
Aug. 23, 2017    (JP) ................................. 2017-160645

(51) Int. Cl.
G06F 9/455      (2018.01)
G06F 9/445      (2018.01)
G06K 9/62       (2006.01)

(52) U.S. Cl.
CPC ...... *G06F 9/45558* (2013.01); *G06F 9/44505* (2013.01); *G06K 9/6267* (2013.01); *G06F 2009/45575* (2013.01); *G06F 2009/45591* (2013.01)

(58) Field of Classification Search
CPC ............. G06F 9/45558; G06F 9/44505; G06F 2009/45575; G06F 2009/45591; G06K 9/6267
See application file for complete search history.

(56) References Cited

U.S. PATENT DOCUMENTS

2013/0227127 A1    8/2013   Takano et al.
2014/0380314 A1*   12/2014   Shimada ............... G06F 9/4856
                                                   718/1
2017/0336768 A1*   11/2017   Geffin .................... G05B 15/02

FOREIGN PATENT DOCUMENTS

JP       2014-153897     8/2014
JP       2015-161956     9/2015
WO    2012/025977     3/2012

* cited by examiner

*Primary Examiner* — Diem K Cao
(74) *Attorney, Agent, or Firm* — Fujitsu Patent Center

(57) ABSTRACT

A non-transitory computer-readable storage medium storing a program that causes a computer to execute a process, the process includes classifying a plurality of virtual machines, which are to be mapped to a plurality of physical machines each of which is subjected to a maintenance operation, into groups by referring to correspondence information in which information indicating a desired time zone for executing a maintenance operation of a physical machine is correlated with information indicating a virtual machine such that an overlap time of desired time zones corresponding to the virtual machines in the same group is equal to or longer than a predetermined time; and mapping the groups obtained by the classifying to the physical machines different from each other.

14 Claims, 15 Drawing Sheets

| VM NAME | DESIRED TIME ZONE (START) [HOUR:MINUTE] | DESIRED TIME ZONE (END) [HOUR:MINUTE] | DESIRED DATE |
|---|---|---|---|
| VM1 | 1:00 | 3:00 | EVERY DAY |
| VM2 | 1:00 | 3:00 | EVERY DAY |
| VM3 | 3:00 | 6:00 | EVERY SATURDAY AND EVERY SUNDAY |
| VM4 | 3:00 | 6:00 | EVERY SATURDAY AND EVERY SUNDAY |
| VM5 | 0:00 | 5:00 | EVERY SUNDAY |
| VM6 | 0:00 | 5:00 | EVERY SUNDAY |

| MAINTENANCE TYPE | AVERAGE RUN-TIME [HOUR:MINUTE] |
|---|---|
| VM MAPPING CHANGE | 0:05 |
| PATCH APPLICATION | 1:40 |
| RESTART OF HOST | 0:05 |

| HOST NAME | NUMBER-OF-CPU | MEMORY [GB] |
|---|---|---|
| HOST 1 | 8 | 64 |
| HOST 2 | 8 | 64 |

FIG. 9

| HOST NAME | AVAILABLE TIME ZONE (START) [HOUR:MINUTE] | AVAILABLE TIME ZONE (END) [HOUR:MINUTE] | AVAILABLE DATE |
|---|---|---|---|
| HOST 1 | 3:00 | 6:00 | EVERY SATURDAY AND EVERY SUNDAY |
| HOST 2 | 1:00 | 3:00 | EVERY SUNDAY |

| No. | HOST 1 | HOST 2 | NUMBER OF SYSTEMS IN WHICH ALL VM CONFIGURATIONS ARE MAPPED TO SAME HOST |
|---|---|---|---|
| 1 | VM1, VM2, VM5 | VM3, VM4, VM6 | 2 |
| 2 | VM1, VM2, VM6 | VM3, VM4, VM5 | 2 |
| 3 | VM1, VM2 | VM3, VM4, VM5, VM6 | 3 |
| 4 | VM3, VM4 | VM1, VM2, VM5, VM6 | 3 |
| 5 | VM3, VM4, VM6 | VM1, VM2, VM5 | 2 |
| 6 | VM3, VM4, VM5 | VM1, VM2, VM6 | 2 |
| 7 | VM3, VM4, VM5, VM6 | VM1, VM2 | 3 |
| 8 | VM1, VM2, VM5, VM6 | VM3, VM4 | 3 |

⇒ NARROW DOWN MAPPING CONFIGURATION CANDIDATES CONSIDERING VM CONFIGURATION OF EACH SYSTEM

1102

| No. | HOST 1 | HOST 2 | NUMBER OF SYSTEMS IN WHICH ALL VM CONFIGURATIONS ARE MAPPED TO SAME HOST |
|---|---|---|---|
| 3 | VM1, VM2 | VM3, VM4, VM5, VM6 | 3 |
| 4 | VM3, VM4 | VM1, VM2, VM5, VM6 | 3 |
| 7 | VM3, VM4, VM5, VM6 | VM1, VM2 | 3 |
| 8 | VM1, VM2, VM5, VM6 | VM3, VM4 | 3 |

FIG. 13

| No. | HOST 1 | HOST 2 | NUMBER OF VM MAPPING CHANGES |
|---|---|---|---|
| 4 | VM3, VM4 | VM1, VM2, VM5, VM6 | 1 |
| 8 | VM1, VM2, VM5, VM6 | VM3, VM4 | 5 |

↙ 1301

⇩ NARROW DOWN MAPPING CONFIGURATION CANDIDATES USING NUMBER OF VM MAPPING CHANGES

| No. | HOST 1 | HOST 2 | NUMBER OF VM MAPPING CHANGES |
|---|---|---|---|
| 4 | VM3, VM4 | VM1, VM2, VM5, VM6 | 1 |

↙ 1302

MAINTENANCE CONTROL METHOD, SYSTEM CONTROL APPARATUS AND STORAGE MEDIUM

CROSS-REFERENCE TO RELATED APPLICATION

This application is based upon and claims the benefit of priority of the prior Japanese Patent Application No. 2017-160645, filed on Aug. 23, 2017, the entire contents of which are incorporated herein by reference.

FIELD

The embodiments discussed herein are related to a maintenance control method, and a system control apparatus, and a storage medium.

BACKGROUND

In the related art, there is a cloud system that includes a plurality of physical machines and operates one or more virtual machines which realize a service provided by a user using one of the physical machines. A maintenance operation including patch application, restart, and the like may be executed on the physical machines of the cloud system.

For example, in the related art, there is a technique for requesting correction of a scheduled movement date in a case where a user inputs a scheduled movement date of a virtual host and the scheduled movement date is later than a scheduled maintenance date. In addition, for example, there is a technique for selecting a physical computation device capable of achieving maximum power saving as a movement destination of a virtual computation device to be moved based on a result obtained by determining whether or not a problem occurs in a network for data transmission and data reception to and from an end user and information indicating a movement destination candidate. In addition, for example, there is a technique for extracting idle periods of each virtual computation device and reserving each virtual computation device such that an end time of a reservation period which is set in the idle period of one virtual computation device matches with or overlaps with a start time of a reservation period which is set in the idle period of another virtual computation device.

Japanese Laid-open Patent Publication No. 2015-161956, Japanese Laid-open Patent Publication No. 2014-153897, and International Publication Pamphlet No. WO 2012/025977 are examples of the related art.

SUMMARY

According to an aspect of the invention, a non-transitory computer-readable storage medium storing a program that causes a computer to execute a process, the process includes classifying a plurality of virtual machines, which are to be mapped to a plurality of physical machines each of which is subjected to a maintenance operation, into groups by referring to correspondence information in which information indicating a desired time zone for executing a maintenance operation of a physical machine is correlated with information indicating a virtual machine such that an overlap time of desired time zones corresponding to the virtual machines in the same group is equal to or longer than a predetermined time; and mapping the groups obtained by the classifying to the physical machines different from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an example of storage contents of a resource management information table;

FIG. 9 is an explanatory diagram illustrating an example of stored contents of a maintenance available time zone information table;

FIG. 11 is an explanatory diagram (part 1) illustrating a first example;

FIG. 13 is an explanatory diagram (part 3) illustrating the first example;

DESCRIPTION OF EMBODIMENTS

On the other hand, in the technique in the related art, a maintenance operation of a physical machine may be executed at an undesired timing of a user, and as a result, a virtual machine on the physical machine may be stopped. For this reason, in some cases, a service provided by a user may be stopped.

In one aspect, an object of the present disclosure is to execute a maintenance operation of a physical machine in a time zone desired by a user of a virtual machine.

Hereinafter, embodiments of a maintenance control program, a maintenance control method, and a system control apparatus according to the present disclosure will be described in detail with reference to the drawings.

Example of Maintenance Control Method According to Embodiment

Figure 1:
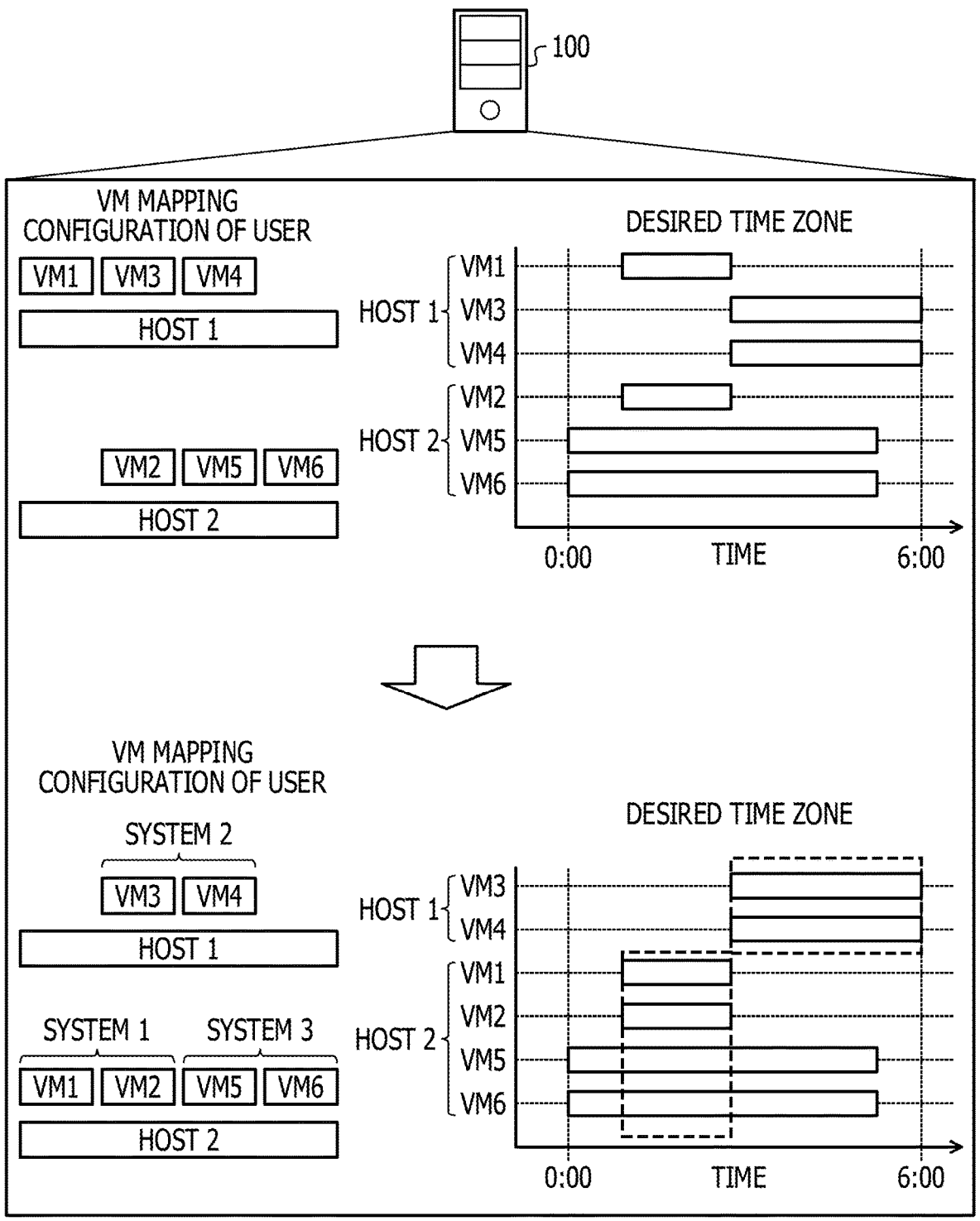
FIG. 1 is an explanatory diagram illustrating an example of a maintenance control method according to an embodiment.

FIG. 1 is an explanatory diagram illustrating an example of a maintenance control method according to an embodiment. A system control apparatus 100 is a computer that controls maintenance operations of a plurality of physical machines and controls mapping of a plurality of virtual machines to a plurality of physical machines.

The physical machine is, for example, a computer on a cloud system. The maintenance operation of the physical machine is a series of operations including a plurality of types of operations. The maintenance operation of the physical machine includes, for example, patch application, rebooting, and the like. The maintenance operation of the physical machine may be any one type of operation among a series of operations. The maintenance operation of the physical machine is an automatic operation or a manual operation.

The mapping of the virtual machine to the physical machine is to operate the virtual machine on the physical machine. The virtual machine is used by a user. The virtual machine is used, for example, to realize a service provided by a user as a service provider. The plurality of virtual machines may include a virtual machine that is not mapped to the physical machine or a virtual machine that is in a stop state on the physical machine.

In the following description, the virtual machine may be referred to as "virtual machine (VM)" in some cases. In the following description, the physical machine may be referred to as a "host" in some cases.

Here, in a maintenance operation of a host, patch application and restarting are performed, and thus there is a case where VM mapped to a host is stopped. In a case where VM is stopped, a service provided by the user using VM also stops.

For this reason, in a time zone in which an adverse effect on the service provided by the user is relatively small, such as a time zone in which the user does not provide the service and a time zone in which usage of the service is relatively small, it is considered that a maintenance operation of a host is executed.

However, there is a case where it is difficult to execute a maintenance operation of a host in a time zone desired by the user. For example, there are different types of services provided by the user, and time zones in which an adverse effect is relatively small are different for each service provided by the user. As a result, an administrator of a host has a difficulty in setting a time zone for an execution of a maintenance operation.

For this reason, when a maintenance operation of a host is executed in a time zone set by the administrator of a host, the virtual machine on the host is stopped at a timing which is not appropriate to the user, and as a result, a service provided by the user may be stopped in some cases.

In this regard, it is considered that designation of a desired time zone for executing a maintenance operation of a host is received for each user.

On the other hand, a plurality of VMs, which are used for services provided by each user of a plurality of users, coexist with each other on one host, and as a result, desired time zones of each user may be different from each other in some cases. For this reason, even when a maintenance operation of a host is executed in a desired time zone of any user of the plurality of users, a service provided by any other user may be adversely affected by the maintenance operation.

Therefore, in the present embodiment, a maintenance control method of changing mapping of the plurality of VMs to a plurality of hosts based on a desired time zone for each user, and executing a maintenance operation of each host will be described.

In the example of FIG. 1, the plurality of hosts include a host 1 and a host 2, each of which is subject to a maintenance operation. The plurality of VMs to be mapped to the plurality of hosts include VM1 to VM6. VM1 and VM2 are used to realize a system 1 of a user. VM3 and VM4 are used to realize a system 2 of a user. VM5 and VM6 are used to realize a system 3 of a user. VM1, VM3, and VM4 operate on the host 1. VM2, VM5, and VM6 operate on the host 2.

The system control apparatus 100 includes correspondence information in which information indicating a desired time zone for executing a maintenance operation of a host is correlated with information indicating VM. The correspondence information is, for example, a maintenance desired-time-zone information table 400 to be described in FIG. 4. The desired time zone corresponding to VM is a desired time zone for executing a maintenance operation of a host related to VM. Specifically, the desired time zone corresponding to VM is a desired time zone for executing a maintenance operation of a host to which VM is mapped when maintenance operations are to be executed on the plurality of hosts in the future.

For example, the system control apparatus 100 receives designation of a desired time zone from a user of VM via a user apparatus, and creates correspondence information. For example, the system control apparatus 100 may receive designation of a desired time zone from an administrator of a host via an administrator apparatus, and create correspondence information.

In the example of FIG. 1, a desired time zone of each of VM1 and VM2 is a time zone from 1:00 to 3:00. In addition, a desired time zone of each of VM3 and VM4 is a time zone from 3:00 to 6:00. In addition, a desired time zone of each of VM5 and VM6 is a time zone from 0:00 to 5:00.

The system control apparatus 100 classifies the plurality of VMs such that an overlap time of desired time zones corresponding to VMs in the same group is equal to or longer than a predetermined time, by referring to the correspondence information. The predetermined time is set, for example, based on a run-time of a maintenance operation. The predetermined time is, for example, a fixed value. The run-time is, specifically, for example, two hours. For example, the system control apparatus 100 classifies the plurality of VMs at a predetermined timing. The predetermined timing is, for example, a timing designated by a user of the system control apparatus 100, or a timing when a predetermined operation input by the user of the system control apparatus 100 is received.

For example, the system control apparatus 100 classifies VM3 and VM4 into one group. In addition, the system control apparatus 100 classifies, for example, VM1, VM2, VM5, and VM6 into one group. In this manner, the system control apparatus 100 creates groups of a number which does not exceed the number of hosts based on a classification result. On the other hand, the system control apparatus 100 may create a group once, map the group to any one host, and then create the next group.

The system control apparatus 100 maps the groups obtained by classification to different hosts. For example, the system control apparatus 100 maps VM3 and VM4 included in one group to the host 1, and operates VM3 and VM4. In addition, for example, the system control apparatus 100 maps VM1, VM2, VM5, and VM6 included in one group to the host 2, and operates VM1, VM2, VM5, and VM6.

Thereby, even when desired time zones are different for each VM, the system control apparatus 100 may execute a maintenance operation of a host in a desired time zone of a user of VM. Therefore, the system control apparatus 100 may avoid that VM is stopped in a time zone other than desired time zones of a user of VM and a service is stopped, and thus it is possible to improve convenience of VM.

In addition, the system control apparatus 100 may set a run-time of a maintenance operation to a predetermined time, and thus it is possible to complete a maintenance operation in a desired time zone of a user of VM without stopping the maintenance operation. Therefore, the system control apparatus 100 may avoid that a service is stopped with accuracy. In addition, when the number of created groups does not exceed the number of hosts, the system control apparatus 100 may map one group for each host, and thus it is possible to avoid that a maintenance operation is executed in a time zone other than the desired time zone of each VM in any group.

Although a case where the system control apparatus 100 creates a plurality of groups and then maps each group to a host is described, this embodiment is not limited thereto. For example, there may be a case where the system control apparatus 100 repeats a series of operations of creating one group and mapping the created group to one host until there are no VMs to be classified.

Although a case where the system control apparatus 100 may divide VMs, each of which is used in a system that realizes a service provided by a user, into different groups is described, this embodiment is not limited thereto. For example, there may be a case where the system control apparatus 100 may include VMs, each of which is used in one system that realizes a service provided by a user, into one group. Thereby, the system control apparatus 100 may suppress an increase in time during which one of VMs used in a system is stopped and thus a service realized by the system is stopped.

Although a case where the system control apparatus 100 sets the predetermined time for comparison with the overlap time to a fixed value regardless of a type of maintenance is described, this embodiment is not limited thereto. For example, the system control apparatus 100 may change the predetermined time for comparison with the overlap time according to a type of maintenance. Thereby, the system control apparatus 100 may easily classify the plurality of VMs, as compared with a case where the fixed value is set to be larger than a run-time corresponding to a type of maintenance. On the other hand, the system control apparatus 100 may make a maintenance operation to be successfully executed, as compared with a case where the fixed value is set to be too smaller than a run-time corresponding to a type of maintenance.

Although a case where the system control apparatus 100 classifies the plurality of VMs into a plurality of groups such that each group includes two or more VMs is described, this embodiment is not limited thereto. For example, there may be a case where the system control apparatus 100 classifies the plurality of VMs into a plurality of groups such that there may be a group including one VM instead of including two or more VMs.

Here, there may be a case where a maintenance operation is executed on all hosts of a cloud system, or there may be a case where a maintenance operation is not executed on any host of a cloud system. When the plurality of VMs are classified into a plurality of groups, even in a case where each group is mapped to a host that executes a maintenance operation, or even in a case where each group is mapped to a host that does not execute a maintenance operation, the system control apparatus 100 may avoid that a service is stopped.

Here, when classifying the plurality of VMs, or when mapping the plurality of groups obtained by classification to the plurality of hosts, the system control apparatus 100 may reduce the number of VMs of which the mapping is changed. Thereby, the system control apparatus 100 may reduce a load on a host and VM related to a maintenance operation.

Here, there may be a case where a desired time zone of any VM is not designated by a user. In this case, for example, the system control apparatus 100 may set a desired time zone of VM, for which a desired time zone is not designated by a user, to "all the time".

Although a case where the system control apparatus 100 creates groups of a number which does not exceed the number of hosts is described, this embodiment is not limited thereto. For example, there may be a case where the system control apparatus 100 creates groups of a number which exceeds the number of hosts. Even when the system control apparatus 100 creates groups of a number which exceeds the number of hosts, the system control apparatus 100 may avoid that each VM of a group, which is independently mapped to a host, is stopped, and thus it is possible to avoid that a service is stopped.

Further, the system control apparatus 100 may avoid that each VM of any group of the plurality of groups mapped to a host is stopped, and thus it is possible to avoid that a service is stopped. In other words, the system control apparatus 100 may avoid that VMs of groups of the same number as the number of hosts among the created groups are stopped, and thus it is possible to avoid that a service is stopped.

When there is an upper limit on the number of VMs that may be mapped to one host, the system control apparatus 100 may classify the plurality of VMs into a plurality of groups based on the upper limit of the number of VMs that may be mapped to one host. For example, the system control apparatus 100 makes the number of VMs included in one group be equal to or less than the upper limit.

Example of Maintenance Control System 200

Next, an example of a maintenance control system 200 to which the system control apparatus 100 illustrated in FIG. 1 is applied will be described with reference to FIG. 2.

Figure 2:
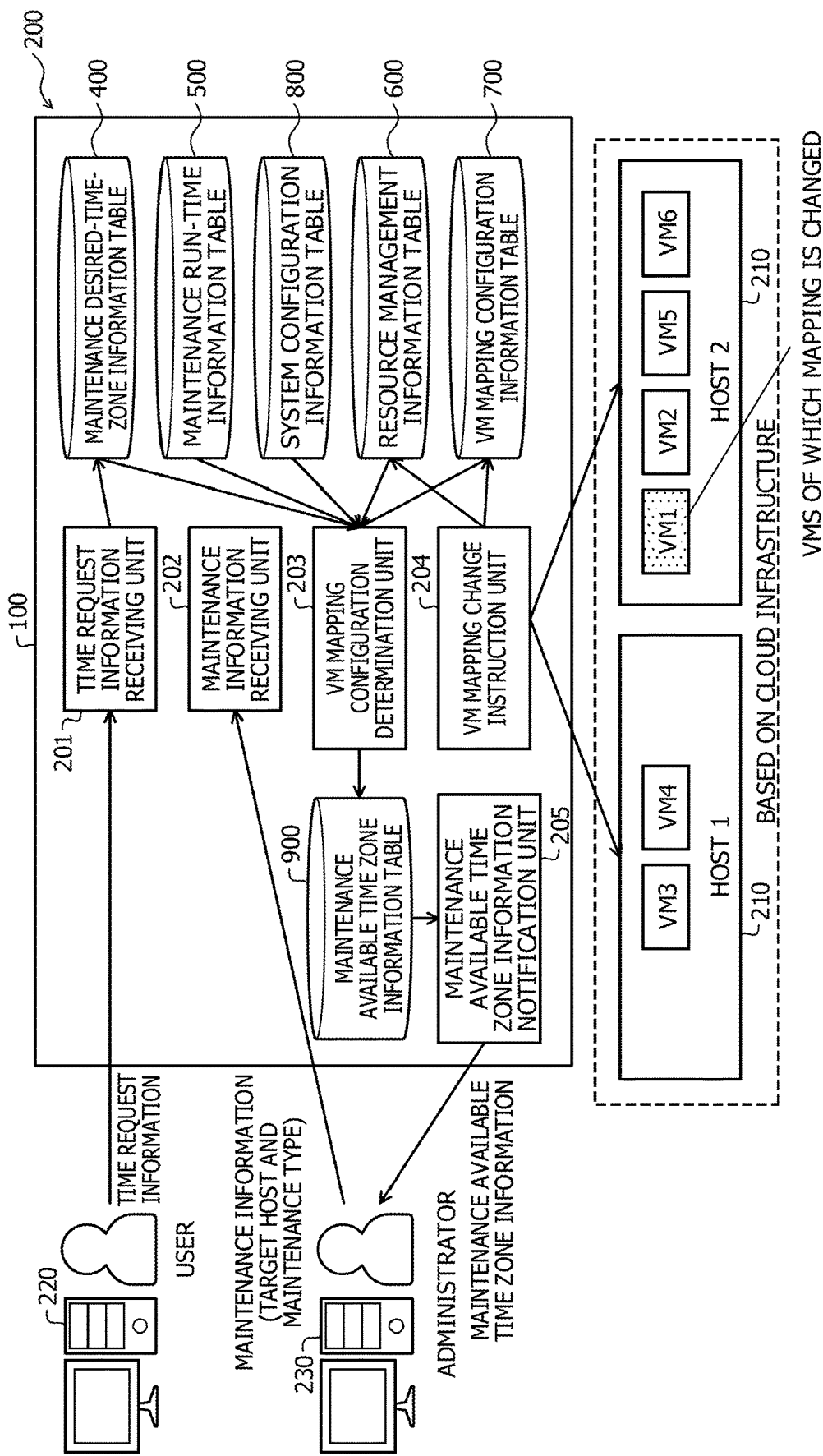
FIG. 2 is an explanatory diagram illustrating an example of a maintenance control system.

FIG. 2 is an explanatory diagram illustrating an example of a maintenance control system 200. In FIG. 2, the maintenance control system 200 includes the system control apparatus 100, a plurality of hosts 210 based on cloud, a plurality of user apparatuses 220, and an administrator apparatus 230.

In the maintenance control system 200, the system control apparatus 100 and the host 210 are connected to each other via a wired network or a wireless network. The network is, for example, a local area network (LAN), a wide area network (WAN), the Internet, or the like. In addition, the system control apparatus 100 and the user apparatus 220 are connected to each other via a wired network or a wireless network. In addition, the system control apparatus 100 and the administrator apparatus 230 are connected to each other via a wired network or a wireless network.

In the system control apparatus 100, a time request information receiving unit 201 receives time request information indicating a desired time zone for executing a maintenance operation, from the user apparatus 220. In the system control apparatus 100, the time request information receiving unit 201 updates a maintenance desired-time-zone information table 400 (to be described in FIG. 4) based on the received time request information. In the system control apparatus 100, a maintenance information receiving unit 202 receives maintenance information including information such as a target host 210 to be subjected to a maintenance operation and a type of a maintenance operation, from the administrator apparatus 230, and stores the received maintenance information.

In the system control apparatus 100, a VM mapping configuration determination unit 203 determines mapping of the plurality of VMs to the plurality of hosts 210. In the system control apparatus 100, a VM mapping change instructing unit 204 changes mapping of the plurality of VMs to the plurality of hosts 210. In the system control apparatus 100, a maintenance available time zone information notification unit 205 transmits maintenance available time zone information to the administrator apparatus 230.

The time request information receiving unit 201, the maintenance information receiving unit 202, the VM mapping configuration determination unit 203, the VM mapping change instruction unit 204, the maintenance available time zone information notification unit 205, and the like are realized by, for example, a control unit including an acquisition unit 1001 to an output unit 1004 to be described with reference to FIG. 10. The system control apparatus 100 is, for example, a server, a personal computer (PC), or the like.

The host 210 operates VM. The host 210 moves VM according to a control of the system control apparatus 100. The host 210 is, for example, the host 1 or the host 2 of FIG. 1. The host 210 is, for example, a server, a PC, or the like.

The user apparatus 220 transmits time request information indicating a desired time zone for executing a maintenance operation, to the system control apparatus 100, according to an operation input of a user. The user apparatus 220 is, for example, a server, a PC, a tablet terminal, a smartphone, or the like.

The administrator apparatus 230 transmits maintenance information including information such as a target host 210 to be subjected to a maintenance operation and a type of a maintenance operation, to the system control apparatus 100, according to an operation input of an administrator. The administrator apparatus 230 receives maintenance available time zone information, and notifies the administrator of the maintenance available time zone information. The administrator determines a schedule of a maintenance operation based on the maintenance available time zone information. The administrator apparatus 230 is, for example, a server, a PC, a tablet terminal, a smartphone, or the like.

Hardware Configuration Example of System Control Apparatus 100

Next, a hardware configuration example of the system control apparatus 100 will be described with reference to FIG. 3.

Figure 3:
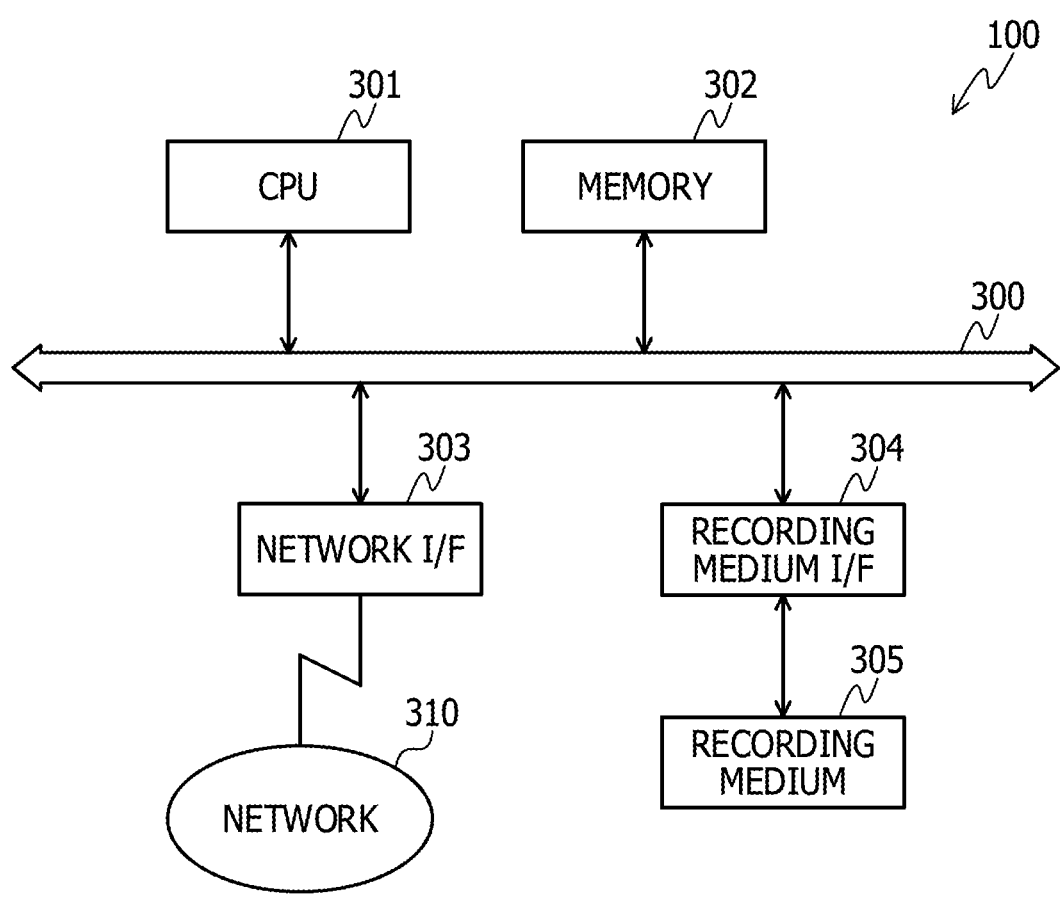
FIG. 3 is a block diagram illustrating a hardware configuration example of a system control apparatus.

FIG. 3 is a block diagram illustrating a hardware configuration example of the system control apparatus 100. In FIG. 3, the system control apparatus 100 includes a central processing unit (CPU) 301, a memory 302, a network interface (I/F) 303, a recording medium I/F 304, and a recording medium 305. In addition, the components are connected to each other via a bus 300.

Here, the CPU 301 controls the entire system control apparatus 100. The memory 302 includes, for example, a read only memory (ROM), a random access memory (RAM), a flash ROM, and the like. More specifically, for example, a flash ROM or a ROM stores various programs, and a RAM is used as a work area of the CPU 301. The program stored in the memory 302 is loaded into the CPU 301, and causes the CPU 301 to execute coded processing. The memory 302 stores various tables to be described with reference to FIGS. 4 to 9.

The network I/F 303 is connected to a network 310 via a communication line, and is connected to another computer via the network 310. The network I/F 303 controls an interface between the network 310 and internal circuits of the system control apparatus, and controls input/output of data from and to another computer. As the network I/F 303, for example, a modem, a LAN adapter, or the like may be adopted.

The recording medium I/F 304 controls read/write of data from/to the recording medium 305 according to a control of the CPU 301. The recording medium I/F 304 is, for example, a disk drive, a solid state drive (SSD), a Universal Serial Bus (USB) port, or the like. The recording medium 305 is a nonvolatile memory that stores write data according to a control of the recording medium I/F 304. The recording medium 305 is, for example, a disk, a semiconductor memory, a USB memory, or the like. The recording medium 305 may be detachable from the system control apparatus 100.

The system control apparatus 100 may include, for example, a keyboard, a mouse, a display, a printer, a scanner, a microphone, a speaker, and the like in addition to the above-described components. In addition, the system control apparatus 100 may not include the recording medium I/F 304 or the recording medium 305.

Stored Contents of Maintenance Desired-Time-Zone Information Table 400

Next, stored contents of the maintenance desired-time-zone information table 400 will be described with reference to FIG. 4. The maintenance desired-time-zone information table 400 is realized in, for example, a storage area such as the memory 302 or the recording medium 305 of the system control apparatus 100 illustrated in FIG. 3.

Figure 4:
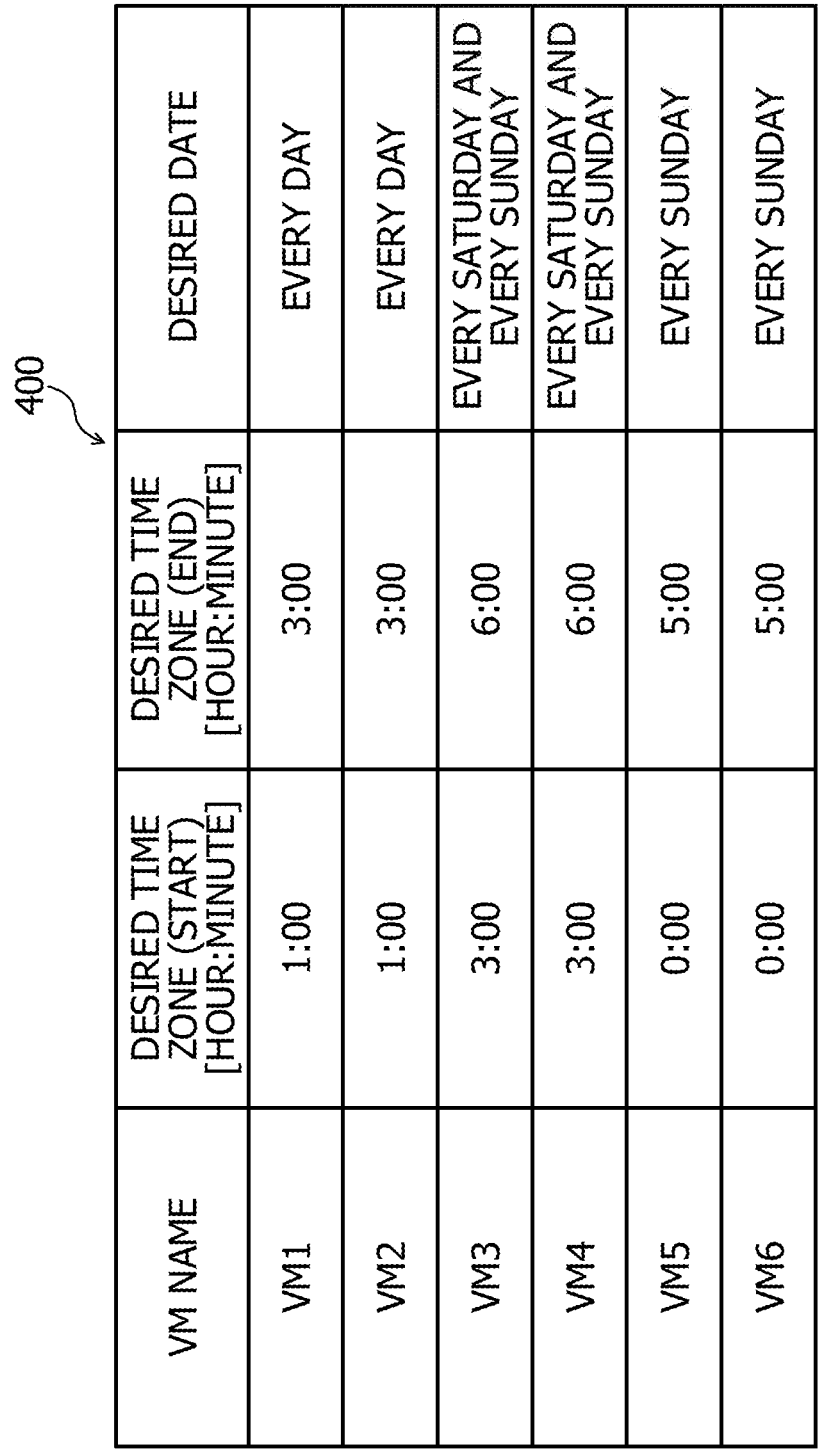
FIG. 4 is an explanatory diagram illustrating an example of stored contents of a maintenance desired-time-zone information table.

FIG. 4 is an explanatory diagram illustrating an example of stored contents of the maintenance desired-time-zone information table 400. As illustrated in FIG. 4, the maintenance desired-time-zone information table 400 includes a VM name field, a desired time zone (start) field, a desired time zone (end) field, and a desired date field. In each field of the maintenance desired-time-zone information table 400, information is set for each VM, and thus desired time zone information is stored as a record.

In the VM name field, a VM name for identifying VM is set. In the desired time zone (start) field, a start time of a desired time zone for executing a maintenance operation is set. The start time is represented by, for example, "hour: minute". In the desired time zone (end) field, an end time of a desired time zone for executing a maintenance operation is set. The end time is represented by, for example, "hour: minute". In the desired date field, a desired date on which a maintenance operation is to be executed is set. The desired date is represented by, for example, a day of the week or a date.

Storage Contents of Maintenance Run-Time Information Table 500

Next, stored contents of a maintenance run-time information table 500 will be described with reference to FIG. 5. The maintenance run-time information table 500 is realized in, for example, a storage area such as the memory 302 or the recording medium 305 of the system control apparatus 100 illustrated in FIG. 3.

Figure 5:
FIG. 5 is an explanatory diagram illustrating an example of stored contents of a maintenance run-time information table.

FIG. 5 is an explanatory diagram illustrating an example of stored contents of the maintenance run-time information table 500. As illustrated in FIG. 5, the maintenance run-time information table 500 includes a maintenance type field and an average run-time field. In each field of the maintenance run-time information table 500, information is set for each maintenance operation type, and thus run-time information is stored as a record.

In the maintenance type field, a name indicating a type of a maintenance operation is set. In the average run-time field, an average value is set as a statistical value of a run-time of a maintenance operation with a type indicated by the maintenance type field. The average value is represented by, for example, "hour:minute". The statistical value may be, for example, a maximum value, a minimum value, a most frequent value, a median value, or the like.

Stored Contents of Resource Management Information Table 600

Next, stored contents of a resource management information table 600 will be described with reference to FIG. 6. The resource management information table 600 is realized in, for example, a storage area such as the memory 302 or the recording medium 305 of the system control apparatus 100 illustrated in FIG. 3.

FIG. 6 is an explanatory diagram illustrating an example of storage contents of the resource management information table 600. As illustrated in FIG. 6, the resource management information table 600 includes a host name field, a number-of-CPU field, and a memory field. In each field of the resource management information table 600, information is set for each host 210, and thus resource information is stored as a record.

In the host name field, a host name for identifying a host 210 is set. In the number-of-CPU field, the number of CPUs provided on a host 210 is set. In the memory field, a size of a memory provided on a host 210 is set. The size of a memory is represented by, for example, "GB".

Stored Contents of VM Mapping Configuration Information Table 700

Next, stored contents of a VM mapping configuration information table 700 will be described with reference to FIG. 7. The VM mapping configuration information table 700 is realized in, for example, a storage area such as the memory 302 or the recording medium 305 of the system control apparatus 100 illustrated in FIG. 3.

Figure 7:
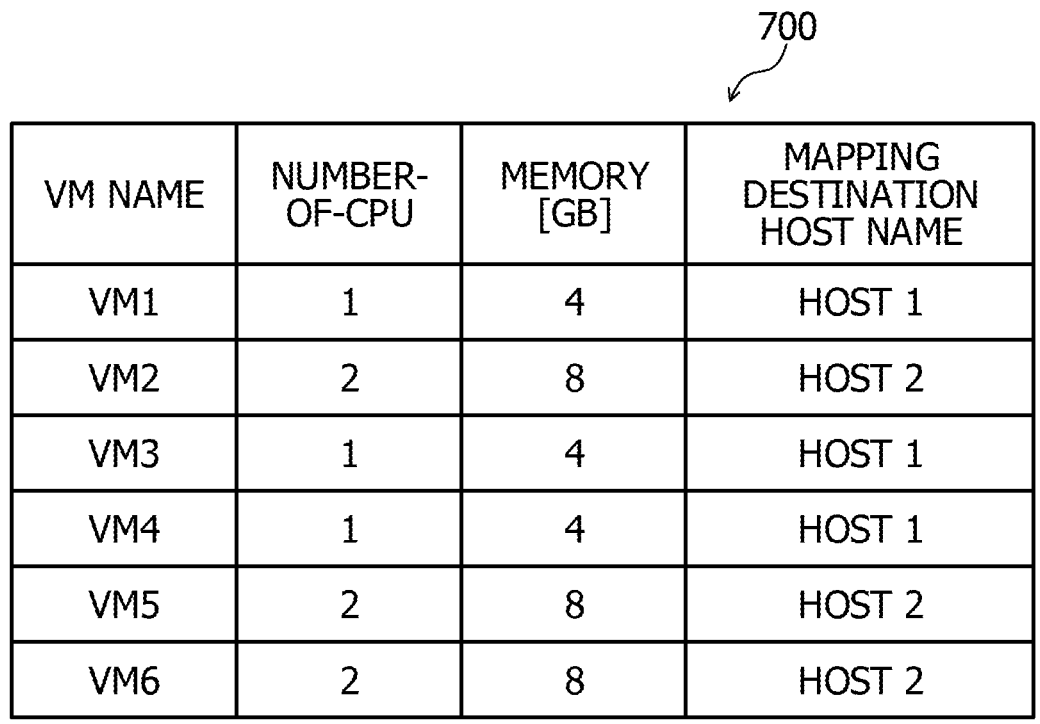
FIG. 7 is an explanatory diagram illustrating an example of storage contents of a VM mapping configuration information table.

FIG. 7 is an explanatory diagram illustrating an example of storage contents of the VM mapping configuration information table 700. As illustrated in FIG. 7, the VM mapping configuration information table 700 includes a VM name field, a number-of-CPU field, a memory field, and a mapping destination host name field. In each field of the VM mapping configuration information table 700, information is set for each VM, and thus specification information is stored as a record.

In the VM name field, a VM name for identifying VM is set. In the number-of-CPU field, the number of CPUs used for an operation of VM is set. In the memory field, a size of a memory used for an operation of VM is set. The size of a memory is represented by, for example, "GB". In the mapping destination host name field, a host name for identifying a host 210 to which VM is mapped is set.

Stored Contents of System Configuration Information Table 800

Next, stored contents of a system configuration information table 800 will be described with reference to FIG. 8. The system configuration information table 800 is realized in, for example, a storage area such as the memory 302 or the recording medium 305 of the system control apparatus 100 illustrated in FIG. 3.

Figure 8:
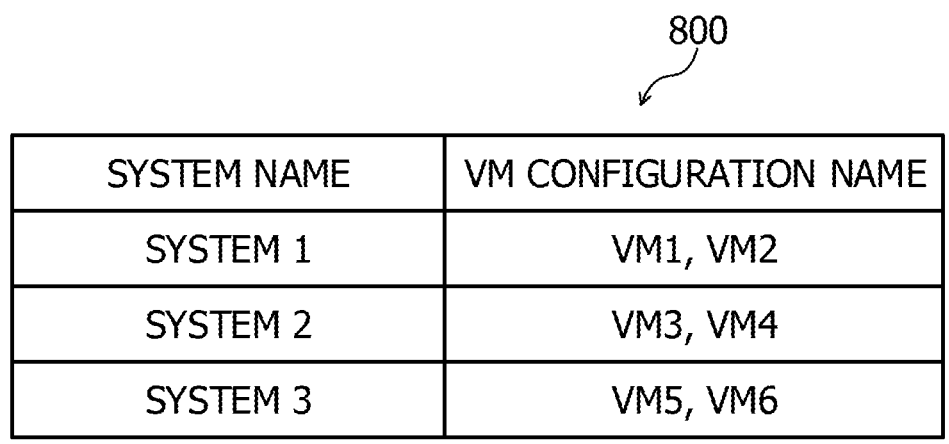
FIG. 8 is an explanatory diagram illustrating an example of stored contents of a system configuration information table.

FIG. 8 is an explanatory diagram illustrating an example of stored contents of the system configuration information table 800. As illustrated in FIG. 8, the system configuration information table 800 includes a system name field and a VM configuration name field. In each field of the system configuration information table 800, information is set for each system, and thus system configuration information is stored as a record.

In the system name field, a system name for identifying a system that realizes a service provided by a user is set. In the VM configuration name field, a VM name for identifying VM used in a system that realizes a service provided by a user is set.

Stored Contents of Maintenance Available Time Zone Information Table 900

Next, stored contents of a maintenance available time zone information table 900 will be described with reference to FIG. 9. The maintenance available time zone information table 900 is realized in, for example, a storage area such as the memory 302 or the recording medium 305 of the system control apparatus 100 illustrated in FIG. 3.

FIG. 9 is an explanatory diagram illustrating an example of stored contents of the maintenance available time zone information table 900. As illustrated in FIG. 9, the maintenance available time zone information table 900 includes a host name field, an available time zone (start) field, an available time zone (end) field, and an available date field. In each field of the maintenance available time zone information table 900, information is set for each host 210, and thus maintenance available time zone information is stored as a record.

In the host name field, a host name for identifying a host 210 is set. In the available time zone (start) field, a start time of an available time zone, which is a time zone for actually executing a maintenance operation, is set. The start time is represented by, for example, "hour:minute". In the available time zone (end) field, an end time of an available time zone, which is a time zone for actually executing a maintenance operation, is set. The end time is represented by, for example, "hour:minute". In the available date field, a desired date, on which a maintenance operation is to be actually executed, is set. The desired date is represented by, for example, a day of the week or a date.

Hardware Configuration Example of Host 210

A hardware configuration example of the host 210 is similar to the hardware configuration example of the system control apparatus 100 illustrated in FIG. 3, and thus a description thereof will be omitted.

Hardware Configuration Example of User Apparatus 220

A hardware configuration example of the user apparatus 220 is similar to the hardware configuration example of the system control apparatus 100 illustrated in FIG. 3, and thus a description thereof will be omitted.

Hardware Configuration Example of Administrator Apparatus 230

A hardware configuration example of the administrator apparatus 230 is similar to the hardware configuration example of the system control apparatus 100 illustrated in FIG. 3, and thus a description thereof will be omitted.

Functional Configuration Example of System Control Apparatus 100

Next, a functional configuration example of the system control apparatus 100 will be described with reference to FIG. 10.

Figure 10:
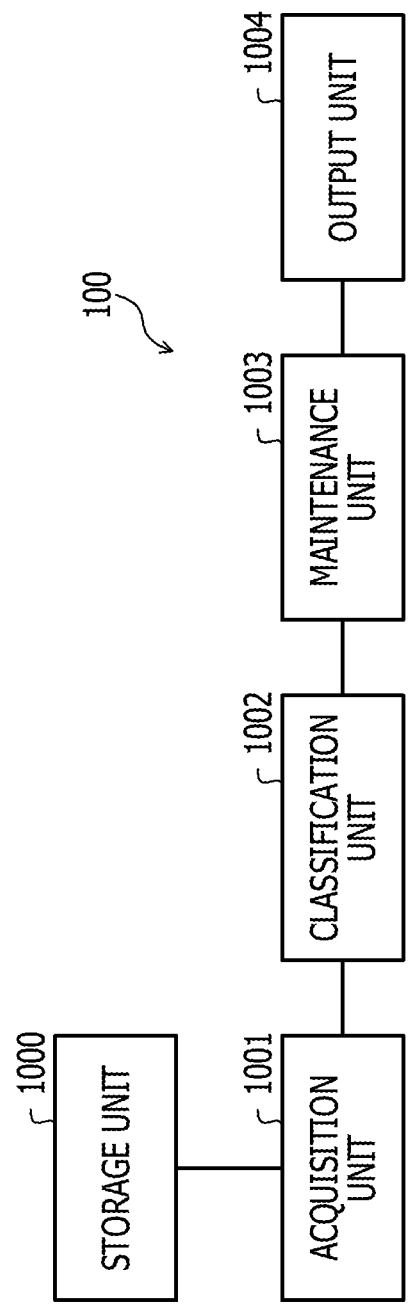
FIG. 10 is a block diagram illustrating a functional configuration example of the system control apparatus.

FIG. 10 is a block diagram illustrating a functional configuration example of the system control apparatus 100. The system control apparatus 100 includes a storage unit 1000, an acquisition unit 1001, a classification unit 1002, a maintenance unit 1003, and an output unit 1004.

The storage unit 1000 is realized by, for example, a storage area such as the memory 302 or the recording medium 305 illustrated in FIG. 3.

The acquisition unit 1001 to the output unit 1004 function as a control unit. More specifically, functions of the acquisition unit 1001 to the output unit 1004 are realized, for example, by causing the CPU 301 to execute a program stored in a storage area such as the memory 302 or the recording medium 305 illustrated in FIG. 3, or by using the network I/F 303. The processing result of each functional unit is stored, for example, in a storage area such as the memory 302 or the recording medium 305 illustrated in FIG. 3.

The storage unit 1000 stores first correspondence information in which information indicating a desired time zone is correlated with information indicating a virtual machine, the desired time zone for executing a maintenance operation of a physical machine. The information indicating a desired time zone may be information indicating a time zone for prohibiting a maintenance operation. The first correspondence information may be information in which information indicating a virtual machine that is not mapped to a physical machine or a virtual machine that is in a stop state on a physical machine is correlated with information indicating a desired time zone. The first correspondence information corresponds to, for example, the maintenance desired-time-zone information table 400 illustrated in FIG. 4. The storage unit 1000 stores, for example, the maintenance desired-time-zone information table 400 illustrated in FIG. 4. Thus, the classification unit 1002 may obtain information indicating a desired time zone corresponding to a virtual machine by referring to the storage unit 1000.

The storage unit 1000 stores second correspondence information in which information indicating a virtual machine used by a system is correlated with information indicating a system. The second correspondence information corresponds to, for example, the system configuration information table 800 illustrated in FIG. 8. The storage unit 1000 stores, for example, the system configuration information table 800 illustrated in FIG. 8. Thus, the classification unit 1002 may obtain information indicating a virtual machine used by a system by referring to the storage unit 1000.

The storage unit 1000 stores third correspondence information in which information indicating a run-time of a maintenance operation is correlated with information indicating a type of a maintenance operation. The third correspondence information corresponds to the maintenance run-time information table 500 illustrated in FIG. 5. The storage unit 1000 stores, for example, the maintenance run-time information table 500 illustrated in FIG. 5. Thus, the classification unit 1002 may obtain information indicating a run-time of a maintenance operation by referring to the storage unit 1000.

The acquisition unit 1001 receives correspondence information in which information indicating a desired time zone is correlated with information indicating a virtual machine, the desired time zone for executing a maintenance operation of a physical machine. The acquisition unit 1001 updates the first correspondence information stored in the storage unit 1000 based on the received correspondence information. The acquisition unit 1001 receives, for example, time request information indicating a desired time zone for executing a maintenance operation from the user apparatus 220, and updates the maintenance desired-time-zone information table 400 illustrated in FIG. 4 based on the received time request information. Thus, the acquisition unit 1001 may reflect a request of a user to the first correspondence information, and update the first correspondence information to the latest state.

The acquisition unit 1001 receives information indicating a type of a maintenance operation. The acquisition unit 1001 receives, for example, information indicating a type of a maintenance operation, from the user apparatus 220. Thereby, the acquisition unit 1001 may allow the classification unit 1002 to specify a run-time of a maintenance operation corresponding to a type of a maintenance operation.

The classification unit 1002 classifies the plurality of virtual machines, which are to be mapped to the plurality of physical machines that are subject to maintenance operations, such that an overlap time of desired time zones corresponding to the virtual machines in the same group is equal to or longer than a predetermined time, by referring to the first correspondence information. For example, the classification unit 1002 classifies the plurality of virtual machines into the plurality of groups such that each virtual machine of the plurality of virtual machines is included in any group. For example, the classification unit 1002 may classify at least one virtual machine of the plurality of virtual machines into one group. Thereby, when virtual machines are mapped to the same physical machine, the classification unit 1002 may create a group that is a combination of virtual machines each of which may complete a maintenance operation within a desired time zone.

The classification unit 1002 classifies the plurality of virtual machines into groups of a number which does not exceed the number of physical machines. For example, the classification unit 1002 classifies the plurality of virtual machines into groups of the same number as the number of physical machines. Thereby, the classification unit 1002 may map one group to one physical machine. Therefore, the classification unit 1002 may avoid that two or more groups are mapped to one physical machine and a maintenance operation of a physical machine is executed in a time zone other than desired time zones corresponding to the virtual machines in any one group of the two or more groups.

The classification unit 1002 classifies the plurality of virtual machines into groups such that an overlap time of desired time zones corresponding to the virtual machines in the same group is equal to or longer than a predetermined time and virtual machines used by the same system are included in the same group, by referring to the second correspondence information. Thereby, the classification unit 1002 may allow virtual machines used in a system to stop at the same time, and thus it is possible to suppress that virtual machines used in a system are stopped at different timings. Therefore, the classification unit 1002 may suppress an increase in time during which one of virtual machines used in a system is stopped and thus a service realized by the system is stopped.

The classification unit 1002 sets a predetermined time based on a run-time corresponding to received information by referring to the third correspondence information. For example, the classification unit 1002 sets a run-time corresponding to a type of a maintenance operation, as a predetermined time. In addition, for example, the classification unit 1002 may set a time obtained by adding a margin to a run-time, as a predetermined time. Further, for example, in a case where a plurality of types of maintenance operations are designated, the classification unit 1002 may set a total run-time corresponding to each type, as a predetermined time. Thereby, the classification unit 1002 may change a run-time for comparison with an overlap time according to a type of maintenance, and thus create a group that is a combination of virtual machines each of which may complete a maintenance operation with high accuracy.

The classification unit 1002 classifies the plurality of virtual machines such that an overlap time of desired time zones corresponding to the virtual machines in the same group is equal to or longer than a predetermined time and an overlap time of desired time zones corresponding to the virtual machines in the same group increases. Thereby, in a case where a group is mapped to a physical machine, the classification unit 1002 may increase a time zone for executing a maintenance operation of a physical machine. Therefore, the classification unit 1002 may allow an administrator to easily set a time zone for executing a maintenance operation. In addition, the classification unit 1002 may allow an administrator to easily process a case where a run-time of a maintenance operation is increased due to a problem in a maintenance operation.

When there are virtual machines that are not classified into groups, the classification unit 1002 classifies one virtual machine that is not classified into a group, into a new group. Thereby, the classification unit 1002 may allow that there is no virtual machine that is not classified into a group, and thus it is possible to avoid that a virtual machine is not mapped to a physical machine.

The maintenance unit 1003 maps the groups obtained by classification to different physical machines. For example, immediately after the classification unit 1002 classifies the plurality of virtual machines into the plurality of groups, the maintenance unit 1003 maps the groups obtained by classification to different physical machines. In addition, for example, the maintenance unit 1003 may map the groups to different physical machines, as a part of a maintenance operation of a physical machine. Thereby, the maintenance unit 1003 may allow that there is no virtual machine which is stopped in a time zone other than desired time zones even when a maintenance operation is executed.

The maintenance unit 1003 maps the groups obtained by classification to different physical machines, and then executes a maintenance operation of a physical machine in an overlap time zone of desired time zones corresponding to the virtual machines in the group mapped to the physical machine. Thereby, the maintenance unit 1003 may allow that there is no virtual machine that is stopped in a time zone other than desired time zones by a maintenance operation, and then complete a maintenance operation.

The maintenance unit 1003 executes a maintenance operation of a physical machine in an overlap time zone of desired time zones corresponding to the virtual machines in the group obtained by classification, the maintenance operation including mapping of the groups to physical machines. Thereby, the maintenance unit 1003 may map the groups to different physical machines, as a part of a maintenance operation of a physical machine.

The output unit 1004 outputs processing results of each functional unit. The output format is, for example, display on a display, printing using a printer, transmission to an external apparatus via the network I/F 303, or storing in a storage area such as the memory 302 or the recording medium 305. Thereby, the output unit 1004 may allow an administrator to refer to the processing results of each functional unit when managing a host, and thus it is possible to support a management operation.

In addition, the output unit 1004 may output information indicating each group of the plurality of groups obtained by classification. Thereby, the output unit 1004 may allow an administrator to change mapping of the plurality of virtual machines to the plurality of physical machines, and thus it is possible to map the plurality of virtual machines reflecting an intention of an administrator. Therefore, it is possible to support a management operation.

In addition, the output unit 1004 may output an overlap time zone of desired time zones corresponding to VMs in each group, as a maintenance available time zone of each group. Thereby, the output unit 1004 allows an administrator to recognize when to execute a maintenance operation of each physical machine, and to manually execute a maintenance operation of each physical machine.

Further, the output unit 1004 may notify a user of each VM in each group, of a time zone for executing a maintenance operation of a physical machine to which each group is mapped. Thereby, the output unit 1004 may allow a user of each VM of each group to easily process a maintenance operation, and thus it is possible to improve convenience of VM.

First Example

Next, a first example will be described with reference to FIGS. 11 to 13.

Figure 12:
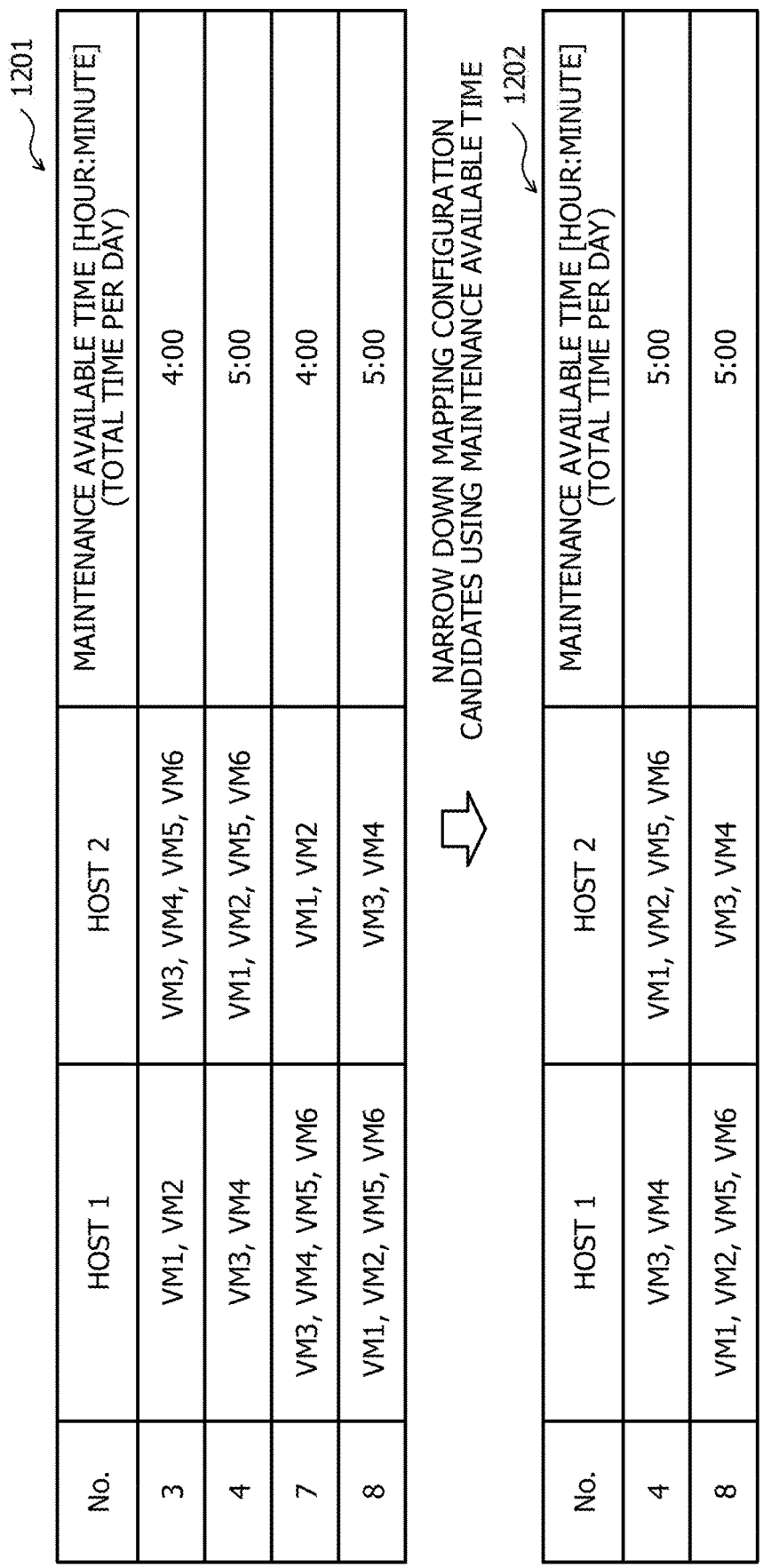
FIG. 12 is an explanatory diagram (part 2) illustrating the first example.

FIG. 11 to FIG. 13 are explanatory diagrams illustrating a first example. In examples of FIG. 11 to FIG. 13, the system control apparatus 100 classifies VM1 to VM6 into two groups according to the number of hosts, and maps the two groups obtained by classification to a host 1 and a host 2. First, the first example will be described with reference to FIG. 11.

In FIG. 11, the system control apparatus 100 acquires desired time zones and desired dates of VM1 to VM6 by referring to the maintenance desired-time-zone information table 400. In addition, the system control apparatus 100 acquires a run-time of the corresponding maintenance type by referring to the maintenance run-time information table 500.

Next, the system control apparatus 100 classifies VM1 to VM6 into two groups such that an overlap time, during which desired time zones corresponding to VMs in each group overlap with each other, is equal to or longer than the run-time, and creates mapping configuration candidates for mapping the groups to the host 1 and the host 2. In the example of FIG. 11, as illustrated in a table 1101, the system control apparatus 100 creates and stores a first mapping configuration candidate (No. 1) to an eighth mapping configuration candidate (No. 8).

A first mapping configuration candidate (No. 1) indicates that a group including VM1, VM2, and VM5 is mapped to the host 1 and a group including VM3, VM4, and VM6 is mapped to the host 2. A second mapping configuration candidate (No. 2) indicates that a group including VM1, VM2, and VM6 is mapped to the host 1 and a group including VM3, VM4, and VM5 is mapped to the host 2.

A third mapping configuration candidate (No. 3) indicates that a group including VM1 and VM2 is mapped to the host 1 and a group including VM3 to VM6 is mapped to the host 2. A fourth mapping configuration candidate (No. 4) indicates that a group including VM3 and VM4 is mapped to the host 1 and a group including VM1, VM2, VM5, and VM6 is mapped to the host 2.

A fifth mapping configuration candidate (No. 5) indicates that a group including VM3, VM4, and VM6 is mapped to the host 1 and a group including VM1, VM2, and VM5 is mapped to the host 2. A sixth mapping configuration candidate (No. 6) indicates that a group including VM3, VM4, and VM5 is mapped to the host 1 and a group including VM1, VM2, and VM6 is mapped to the host 2.

A seventh mapping configuration candidate (No. 7) indicates that a group including VM3 to VM6 is mapped to the host 1 and a group including VM1 and VM2 is mapped to the host 2. An eighth mapping configuration candidate (No. 8) indicates that a group including VM1, VM2, VM5, and VM6 is mapped to the host 1 and a group including VM3 and VM4 is mapped to the host 2.

The system control apparatus 100 calculates the number of systems in which VMs for realizing the same system are mapped to the same host 210, for the first mapping configuration candidate (No. 1) to the eighth mapping configuration candidate (No. 8), by further referring to the system configuration information table 800. In the example of FIG. 11, as illustrated in the table 1101, the system control apparatus 100 calculates and stores the number of systems in which VMs for realizing the same system are mapped to the same host 210.

The system control apparatus 100 narrows down the first mapping configuration candidate (No. 1) to the eighth mapping configuration candidate (No. 8), to the mapping configuration candidate with which the calculated number of systems is the maximum, and specifies the mapping configuration candidate capable of suppressing an adverse influence on a system of a user. In the example of FIG. 11, as illustrated in a table 1102, the system control apparatus 100 narrows down the mapping configuration candidates, to the third mapping configuration candidate (No. 3), the fourth mapping configuration candidate (No. 4), the seventh mapping configuration candidate (No. 7), and the eighth mapping configuration candidate (No. 8), and stores the narrowed-down mapping configuration candidates. Next, the first example will be described with reference to FIG. 12.

In FIG. 12, the system control apparatus 100 calculates an overlap time of desired time zones of VMs to be mapped to each host 210, as a maintenance allowable time, for each of the third mapping configuration candidate (No. 3), the fourth mapping configuration candidate (No. 4), the seventh mapping configuration candidate (No. 7), and the eighth mapping configuration candidate (No. 8) which are narrowed down. In the example of FIG. 12, as illustrated in a table 1201, the system control apparatus 100 calculates a maintenance allowable time for each of the third mapping configuration candidate (No. 3), the fourth mapping configuration candidate (No. 4), the seventh mapping configuration candidate (No. 7), and the eighth mapping configuration candidate (No. 8).

The system control apparatus 100 narrows down the third mapping configuration candidate (No. 3), the fourth mapping configuration candidate (No. 4), the seventh mapping configuration candidate (No. 7), and the eighth mapping configuration candidate (No. 8), to the mapping configuration candidate with a maximum maintenance allowable time, and specifies the mapping configuration candidate capable of easily executing a maintenance operation. In the example of FIG. 12, as illustrated in a table 1202, the system control apparatus 100 narrows down the mapping configuration candidates, to the fourth mapping configuration candidate (No. 4) and the eighth mapping configuration candidate (No. 8), and stores the narrowed-down mapping configuration candidates. Next, the first example will be described with reference to FIG. 13.

In FIG. 13, the system control apparatus 100 calculates the number of VMs of which the mapping is changed as compared with the current VM mapping, for each of the fourth mapping configuration candidate (No. 4) and the eighth mapping configuration candidate (No. 8) which are narrowed down. In the example of FIG. 13, as illustrated in a table 1301, the system control apparatus 100 calculates the number of VMs of which the mapping is changed, for each of the fourth mapping configuration candidate (No. 4) and the eighth mapping configuration candidate (No. 8).

The system control apparatus 100 narrows down the fourth mapping configuration candidate (No. 4) and the eighth mapping configuration candidate (No. 8), to the mapping configuration candidate with the minimum number of mapping changes, and specifies the mapping configuration candidate capable of suppressing an increase in time for mapping changes. In the example of FIG. 13, as illustrated in a table 1302, the system control apparatus 100 narrows down the mapping configuration candidates to the fourth mapping configuration candidate (No. 4), and stores the narrowed-down mapping configuration candidate.

The system control apparatus 100 executes a maintenance operation including a mapping change of VMs based on the narrowed-down fourth mapping configuration candidate (No. 4). Thereby, the system control apparatus 100 may execute a maintenance operation of a host 210 in a desired time zone of a user of VM. Therefore, the system control apparatus 100 may avoid that VM is stopped in a time zone other than desired time zones of a user of VM and a service is stopped, and thus it is possible to improve convenience of VM.

In addition, the system control apparatus 100 may map the plurality of VMs to the plurality of hosts so as to suppress an adverse influence on a system of a user. In addition, the system control apparatus 100 may map the plurality of VMs to the plurality of hosts so as to suppress an increase in time for mapping changes. In addition, the system control apparatus 100 may map the plurality of VMs to the plurality of hosts such that a maintenance available time becomes relatively longer and a maintenance operation is easily executed.

One Example of Mapping Processing Procedure

Next, an example of a mapping processing procedure will be described with reference to FIG. 14 and FIG. 15.

Figure 14:
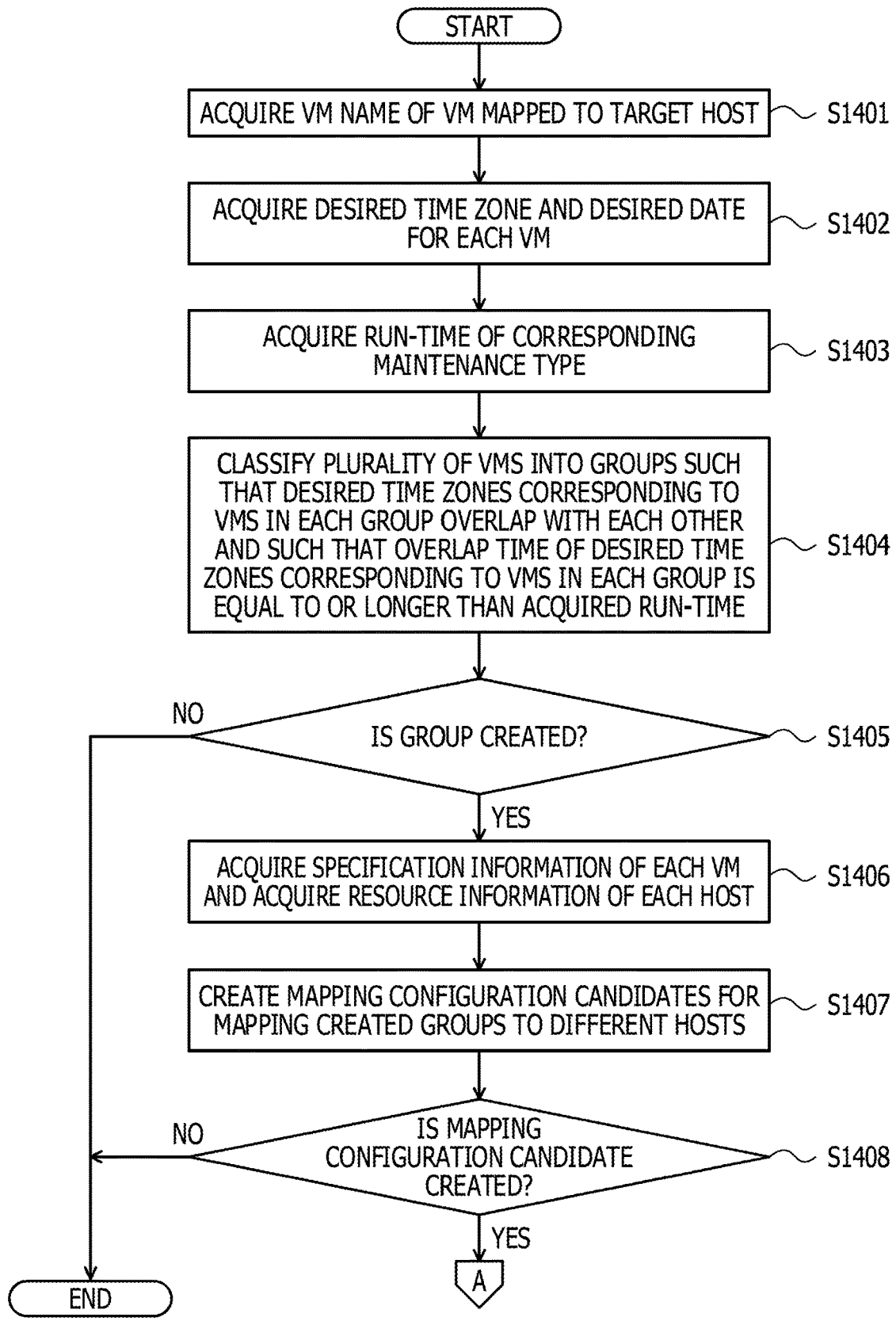
FIG. 14 is a flowchart (part 1) illustrating an example of a mapping processing procedure.
Figure 15:
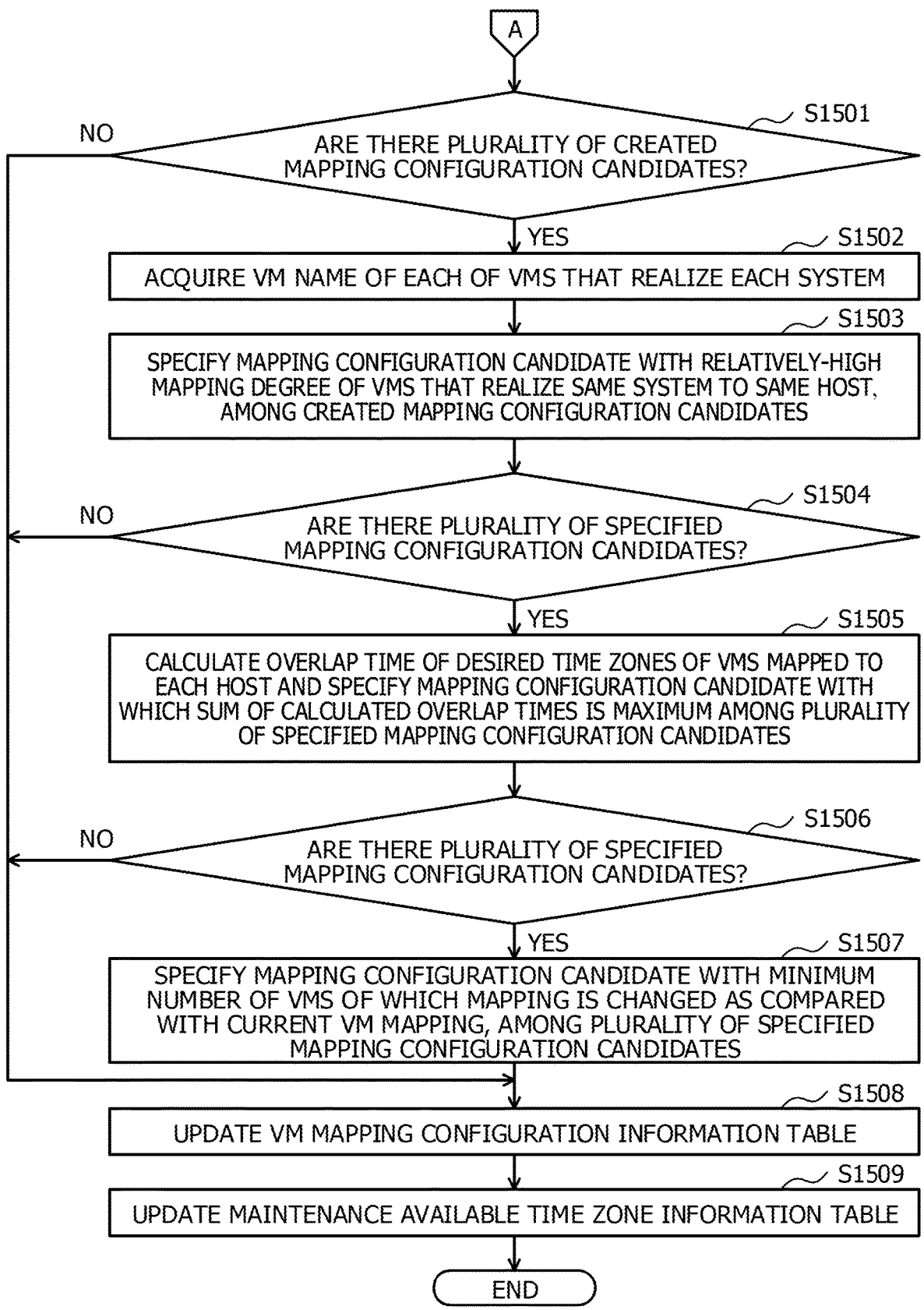
FIG. 15 is a flowchart (part 2) illustrating an example of the mapping processing procedure.

FIG. 14 and FIG. 15 are flowcharts illustrating an example of a mapping processing procedure. In FIG. 14, the system control apparatus 100 acquires a VM name of VM mapped to a target host 210 by referring to the VM mapping configuration information table 700 (step S1401).

Next, the system control apparatus 100 acquires a desired time zone and a desired date for each VM by referring to the maintenance desired-time-zone information table 400 (step S1402). The system control apparatus 100 acquires a run-time of the corresponding maintenance type by referring to the maintenance run-time information table 500 (step S1403).

Next, the system control apparatus 100 classifies the plurality of VMs into groups such that desired time zones corresponding to VMs in each group overlap with each other and such that an overlap time of desired time zones corresponding to VMs in each group is equal to or longer than the acquired run-time (step S1404). The system control apparatus 100 determines whether or not a group is created (step S1405).

Here, in a case where a group is not created (No in step S1405), the system control apparatus 100 ends mapping processing. On the other hand, in a case where a group is created (Yes in step S1405), the system control apparatus 100 proceeds to processing of step S1406.

In step S1406, the system control apparatus 100 acquires specification information of each VM by referring to the VM mapping configuration information table 700, and acquires resource information of each host 210 by referring to the resource management information table 600 (step S1406).

Next, the system control apparatus 100 creates mapping configuration candidates for mapping the created groups to different hosts 210 (step S1407). The system control apparatus 100 determines whether or not a mapping configuration candidate is created (step S1408).

Here, in a case where a mapping configuration candidate is not created (No in step S1408), the system control apparatus 100 ends mapping processing. On the other hand, in a case where a mapping configuration candidate is created (Yes in step S1408), the system control apparatus 100 proceeds to processing of step S1501 of FIG. 15.

In FIG. 15, the system control apparatus 100 determines whether or not there are a plurality of created mapping configuration candidates (step S1501).

Here, in a case where there is one created mapping configuration candidate (No in step S1501), the system control apparatus 100 proceeds to processing of step S1508. On the other hand, in a case where there are a plurality of created mapping configuration candidates (Yes in step S1501), the system control apparatus 100 proceeds to processing of step S1502.

In step S1502, the system control apparatus 100 acquires a VM name of each of VMs that realize each system by referring to the system configuration information table 800 (step S1502). Next, the system control apparatus 100 specifies the mapping configuration candidate with a relatively-high mapping degree of VMs that realize the same system to the same host 210, among the created mapping configuration candidates (step S1503). The system control apparatus 100 determines whether or not there are a plurality of specified mapping configuration candidates (step S1504).

Here, in a case where there is one specified mapping configuration candidate (No in step S1504), the system control apparatus 100 proceeds to processing of step S1508. On the other hand, in a case where there are a plurality of specified mapping configuration candidates (Yes in step S1504), the system control apparatus 100 proceeds to processing of step S1505.

In step S1505, the system control apparatus 100 calculates an overlap time of desired time zones of VMs mapped to each host 210, and specifies the mapping configuration candidate with which the sum of the calculated overlap times is the maximum among the plurality of specified mapping configuration candidates (step S1505). The system control apparatus 100 determines whether or not there are a plurality of specified mapping configuration candidates (step S1506).

Here, in a case where there is one specified mapping configuration candidate (No in step S1506), the system control apparatus 100 proceeds to processing of step S1508. On the other hand, in a case where there are a plurality of specified mapping configuration candidates (Yes in step S1506), the system control apparatus 100 proceeds to processing of step S1507.

In step S1507, the system control apparatus 100 specifies the mapping configuration candidate with the minimum number of VMs each of which the mapping is changed as compared with the current VM mapping, among the plurality of specified mapping configuration candidates (step S1507). The system control apparatus 100 proceeds to processing of step S1508.

In step S1508, the system control apparatus 100 updates the VM mapping configuration information table 700 based on the specified mapping configuration candidate (step S1508). Next, the system control apparatus 100 specifies a maintenance time zone and a maintenance date for each host 210, and updates the maintenance available time zone information table 900 (step S1509).

The system control apparatus 100 ends the mapping processing. Thereby, the system control apparatus 100 may avoid that VM is stopped in a time zone other than desired time zones of a user of VM and a service is stopped, and thus it is possible to improve convenience of VM.

As described above, the system control apparatus 100 may classify the plurality of VMs, which are to be mapped to the plurality of hosts 210 that are subject to maintenance operations, such that an overlap time of desired time zones corresponding to VMs in the same group is equal to or longer than a predetermined time. The system control apparatus 100 may map the groups obtained by classification to different hosts 210. Thereby, the system control apparatus 100 may execute a maintenance operation of a host 210 in a desired time zone of a user of VM. Therefore, the system control apparatus 100 may avoid that VM is stopped in a time zone other than desired time zones of a user of VM and a service is stopped, and thus it is possible to improve convenience of VM.

The system control apparatus 100 may classify the plurality of VMs into groups of a number which does not exceed the number of the hosts 210. Thereby, the system control apparatus 100 may map one group to one host 210. Therefore, the system control apparatus 100 may avoid that two or more groups are mapped to one host 210 and a maintenance operation of a host 210 is executed in a time zone other than desired time zones corresponding to VMs in any one group of the two or more groups.

The system control apparatus 100 may classify the plurality of VMs into groups such that an overlap time of desired time zones corresponding to VMs in the same group is equal to or longer than a predetermined time and VMs used by the same system are included in the same group. Thereby, the system control apparatus 100 may suppress an increase in time during which one of VMs used in a system is stopped and thus a service realized by the system is stopped.

The system control apparatus 100 may receive information indicating a type of a maintenance operation. The system control apparatus 100 may set the predetermined time based on a run-time corresponding to the received information indicating a type of a maintenance operation. Thereby, the system control apparatus 100 may easily classify the plurality of VMs into groups, and make a maintenance operation to be successfully executed.

The system control apparatus 100 may classify the plurality of VMs into groups such that an overlap time of desired time zones corresponding to VMs in the same group is equal to or longer than a predetermined time and such that an overlap time of desired time zones corresponding to VMs in the same group is increased. Thereby, in a case where a group is mapped to a host 210, the system control apparatus 100 may increase a time zone for executing a maintenance operation of a host 210. Therefore, the system control apparatus 100 may allow an administrator to easily set a time zone for executing a maintenance operation. In addition, the system control apparatus 100 may allow an administrator to easily process a case where a run-time of a maintenance operation is increased due to a problem in a maintenance operation.

The system control apparatus 100 may map the groups obtained by classification to different hosts 210, and then execute a maintenance operation of a host 210 in an overlap time zone of desired time zones corresponding to VMs in the group mapped to the host 210. Thereby, the system control apparatus 100 may allow that there is no virtual machine that is stopped in a time zone other than desired time zones by a maintenance operation, and then complete a maintenance operation.

When there are VMs that are not classified into groups, the system control apparatus 100 may classify one VM that is not classified into a group, into a new group. Thereby, the system control apparatus 100 may allow that there is no virtual machine that is not classified into a group, and thus it is possible to avoid that a virtual machine is not mapped to a physical machine.

The system control apparatus 100 may receive correspondence information in which information indicating a desired time zone for executing a maintenance operation of a host 210 is correlated with information indicating VM. Thereby, the system control apparatus 100 may reflect a request of a user to the first correspondence information, and update the first correspondence information to the latest state.

The system control apparatus 100 may receive information indicating a time zone for prohibiting a maintenance operation, as information indicating a desired time zone. The system control apparatus 100 may specify desired time zones based on the time zone for prohibiting a maintenance operation. Thereby, the system control apparatus 100 may allow a user to designate a prohibition time zone in which maintenance is not executed, instead of a desired time zone for executing maintenance. Therefore, the system control apparatus 100 may improve convenience of VM.

The maintenance control method described in the present embodiment may be realized by executing a prepared program on a computer such as a personal computer or a workstation. The maintenance control program described in the present embodiment is recorded in a computer-readable recording medium such as a hard disk, a flexible disk, a CD-ROM, an MO, or a DVD, and is executed by being read from the recording medium by a computer. Further, the maintenance control program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

classifying, by referring to correspondence information in which a virtual machine, a desired time zone for executing a maintenance operation of a physical machine are associated with each other for each of the plurality of virtual machines, a plurality of virtual machines into a plurality of groups based on the desired time zone, an overlap time of one or more desired time zones corresponding to one or more virtual machines included in each of the plurality of groups being equal to or longer than a predetermined time; and mapping, for each of the plurality of groups, the one or more virtual machines to one of the plurality of physical machines such that mapping destinations for the plurality of groups are different from each other; and executing, for each of the plurality of groups, the maintenance operation in a time zone corresponding to the overlap time.

2. The storage medium according to claim 1, wherein the classifying includes classifying the plurality of virtual machines into groups of a number which does not exceed the number of the physical machines.

3. The storage medium according to claim 1, wherein the classifying includes classifying the plurality of virtual machines into groups by referring to correspondence information in which information indicating a system is correlated with information indicating a virtual machine used by the system such that an overlap time of desired time zones corresponding to the virtual machines in the same group is equal to or longer than a predetermined time and such that the virtual machines used by the same system are included in the same group.

4. The storage medium according to claim 1, wherein the process further comprising:

receiving information indicating a type of a maintenance operation; and setting the predetermined time based on a run-time corresponding to the received information by referring to correspondence information in which information indicating a type of a maintenance operation is correlated with information indicating a run-time of the maintenance operation.

5. The storage medium according to claim 1, wherein the classifying includes classifying the plurality of virtual machines into groups such that an overlap time of desired time zones corresponding to the virtual machines in the same group is equal to or longer than a predetermined time and such that an overlap time of desired time zones corresponding to the virtual machines in the same group is increased.

6. The storage medium according to claim 1, wherein, when there is a virtual machine that is not classified into the group, the classifying includes classifying one virtual machine that is not classified into the group into a new group.

7. The storage medium according to claim 1, wherein the process further comprising receiving correspondence information in which information indicating any one virtual machine is correlated with information indicating a desired time zone for executing a maintenance operation of a physical machine.

8. The storage medium according to claim 1, wherein the information indicating a desired time zone is information indicating a time zone for prohibiting a maintenance operation.

9. A maintenance control method executed by a processor of a system control apparatus to execute a process, the maintenance control method comprising:

classifying, by referring to correspondence information in which information indicating a virtual machine, a desired time zone for executing a maintenance operation of a physical machine are associated with each other for each of the plurality of virtual machines, a plurality of virtual machines into a plurality of groups based on the desired time zone, an overlap time of one or more desired time zones corresponding to one or more virtual machines included in each of the plurality of groups being equal to or longer than a predetermined time;

mapping, for each of the plurality of groups, the one or more virtual machines to one of the plurality of physical machines such that mapping destinations for the plurality of groups are different from each other; and executing, for each of the plurality of groups, the maintenance operation in a time zone corresponding to the overlap time.

10. A system control apparatus, comprising
a memory; and
a processor coupled to the memory and configured to:
   classify, by referring to correspondence information in which information indicating a virtual machine, a desired time zone for executing a maintenance operation of a physical machine are associated with each other for each of the plurality of virtual machines, a plurality of virtual machines into a plurality of groups based on the desired time zone, an overlap time of one or more desired time zones corresponding to one or more virtual machines included in each of the plurality of groups being equal to or longer than a predetermined time,
   map, for each of the plurality of groups, the one or more virtual machines to one of the plurality of physical machines such that mapping destinations for the plurality of groups are different from each other, and
   execute, for each of the plurality of groups, the maintenance operation in a time zone corresponding to the overlap time.

11. The system control apparatus according to claim 10, wherein the processor is configured to classify the plurality of virtual machines into groups of a number which does not exceed the number of the physical machines.

12. The system control apparatus according to claim 10, wherein the processor is configured to classify the plurality of virtual machines into groups by referring to correspondence information in which information indicating a system is correlated with information indicating a virtual machine used by the system such that an overlap time of desired time zones corresponding to the virtual machines in the same group is equal to or longer than a predetermined time and such that the virtual machines used by the same system are included in the same group.

13. The system control apparatus according to claim 10, wherein the processor is configured to:
   receive information indicating a type of a maintenance operation; and
   set the predetermined time based on a run-time corresponding to the received information by referring to correspondence information in which information indicating a type of a maintenance operation is correlated with information indicating a run-time of the maintenance operation.

14. The system control apparatus according to claim 10, wherein the processor is configured to classify the plurality of virtual machines into groups such that an overlap time of desired time zones corresponding to the virtual machines in the same group is equal to or longer than a predetermined time and such that an overlap time of desired time zones corresponding to the virtual machines in the same group is increased.

* * * * *